United States Patent
Namikata

(10) Patent No.: US 7,262,870 B1
(45) Date of Patent: Aug. 28, 2007

(54) IMAGE PROCESSING METHOD FOR USE IN PRINTER DRIVER

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/541,615

(22) Filed: Apr. 3, 2000

(30) Foreign Application Priority Data

Apr. 6, 1999 (JP) ............... 11-098722
Apr. 15, 1999 (JP) ............... 11-107791

(51) Int. Cl.
G06K 15/00 (2006.01)
G06F 15/00 (2006.01)

(52) U.S. Cl. ............... 358/1.13; 358/1.14; 358/1.15; 382/181; 382/100

(58) Field of Classification Search .......... 358/1.1–1.9, 358/1.11–1.18; 399/366; 213/902; 382/100, 382/209, 217, 218, 181; 902/7
See application file for complete search history.

(56) References Cited

U.S. PATENT DOCUMENTS

| | | | |
|---|---|---|---|
| 5,321,470 A | 6/1994 | Hasuo et al. | |
| 5,633,952 A | 5/1997 | Outa et al. | 385/165 |
| 5,692,111 A * | 11/1997 | Marbry et al. | 358/1.15 |
| 5,790,165 A * | 8/1998 | Kuboki et al. | 347/257 |
| 5,795,082 A * | 8/1998 | Shimada et al. | 400/120.09 |
| 5,970,183 A | 10/1999 | Amemiya et al. | |
| 6,052,479 A | 4/2000 | Hiraishi et al. | 382/162 |
| 6,091,844 A | 7/2000 | Fujii et al. | |
| 6,108,098 A | 8/2000 | Owada et al. | 658/1.14 |
| 6,346,989 B1 | 2/2002 | Funada et al. | 358/1.14 |
| 6,370,271 B2 * | 4/2002 | Fu et al. | 382/217 |
| 7,088,862 B1 * | 8/2006 | Silver et al. | 382/199 |

FOREIGN PATENT DOCUMENTS

| | | |
|---|---|---|
| EP | 0 649 114 A2 | 4/1995 |
| EP | 0 706 283 | 4/1996 |
| EP | 0 751 475 A2 | 1/1997 |
| EP | 0 843 237 A2 | 5/1998 |
| EP | 0 884 669 A2 | 12/1998 |
| JP | 04-207467 | 7/1992 |
| JP | 05-022593 | 1/1993 |
| JP | 05-110815 | 4/1993 |
| JP | 6-105136 | 4/1994 |
| JP | 06-105139 | 4/1994 |

(Continued)

OTHER PUBLICATIONS

Microsoft Press Computer Dictionary, Microsoft Press, A Division of Microsoft Corporation, 1997.*

(Continued)

Primary Examiner—King Y. Poon
(74) Attorney, Agent, or Firm—Fitzpatrick, Cella, Harper & Scinto

(57) ABSTRACT

An image processing method for use in a printer driver includes steps of receiving an instruction for a printing process, judging whether an image corresponding to a developed image signal represents a specified image according to the printing process, and outputting a result obtained in the judging step so as to use the result processing of the image signal. A forgery preventing module in an operating system outputs an instruction to a display driver for executing a predetermined display according to the result obtained in the judging step.

22 Claims, 9 Drawing Sheets

FOREIGN PATENT DOCUMENTS

| | | |
|---|---|---|
| JP | 6-215136 | 8/1994 |
| JP | 06-245064 | 9/1994 |
| JP | 6-301784 | 10/1994 |
| JP | 06-350846 | 12/1994 |
| JP | 06-350847 | 12/1994 |
| JP | 07-030748 | 1/1995 |
| JP | 7-74939 | 3/1995 |
| JP | 07-135564 | 5/1995 |
| JP | 07-143334 | 6/1995 |
| JP | 7-203197 | 8/1995 |
| JP | 08-328831 | 12/1996 |
| JP | 9-18708 | 1/1997 |
| JP | 09-046577 | 2/1997 |
| JP | 09-172558 | 6/1997 |
| JP | 09-186863 | 7/1997 |
| JP | 09-238251 | 9/1997 |
| JP | 10-21393 | 1/1998 |
| JP | 10-150542 | 6/1998 |
| JP | 10-243223 | 9/1998 |
| JP | 10-308870 | 11/1998 |
| JP | 11-46299 | 2/1999 |

OTHER PUBLICATIONS

Dictionary.com.*

Microsoft Press Computer dictionary, 3$^{rd}$ edition.*

* cited by examiner

FIG. 7

WARNING: THE LAW PROHIBITS YOU TO COPY THIS IMAGE

DO YOU REALLY WANT TO PROCESS THIS IMAGE ?

YES    NO

FIG. 8

LOG INFORMATION

| TIME: | 1998/12/24 10:00 |
|---|---|

HOST COMPUTER INFORMATION:
• MANUFACTURER NAME
• HOST ID
• OS VERSION

IMAGE SIZE:     2500×800

JUDGEMENT RATIO:  95%

IMAGE PROCESSING METHOD FOR USE IN PRINTER DRIVER

BACKGROUND OF THE INVENTION

1. Field of the Invention

The present invention relates to a scanner, a printer, a memory medium and an image processing method.

2. Related Background Art

As a result of recent improvement in the performance of the color image reading device utilizing CCD or the like (such device being hereinafter called color scanner) and of the color printer, there is increasing danger of forging or unlawful reproduction of an original of which reproduction is forbidden, such as a banknote or a valuable security document, by reading such original by the color scanner as the image data and printing such image data by the color printer. In order to prevent such forging, the color copying apparatus consisting of a color scanner and a color printer often incorporates a forgery preventing device which inhibits the copying operation by recognizing the original of which reproduction is forbidden.

However, the forgery preventing device employed in the color copying apparatus functions only in the copying operation, and, if the original forbidden for reproduction is once read by a color scanner, the obtained data can be outputted by a color copying apparatus or another color printer through a controller, so that the original is eventually forged.

SUMMARY OF THE INVENTION

In consideration of the foregoing, an object of the present invention is to provide a configuration capable of suppressing the forgery operation for the image input from a color scanner or the image output to a color printer.

The above-mentioned object can be attained, according to a preferred embodiment of the present invention, by a printer driver capable of receiving an instruction for the printing process, discriminating whether an image developed by a rasterizer represented a specified (specific) image in response to the instruction for the printing process, and outputting the result of the discrimination for use in processing the signal of the image.

Another object of the present invention is to provide a configuration capable of efficient prevention of forgery.

Still another object of the present invention is to provide novel functions.

Still other objects of the present invention, and the features thereof, will become fully apparent from the following detailed description, to be taken in conjunction with the accompanying drawings.

BRIEF DESCRIPTION OF THE DRAWINGS

FIG. 7 is a view showing an example of the image of enquiry to the user in response to an image input forbidden for copying;

FIG. 8 is a view showing an example of the history of operation on an image input forbidden for copying;

DESCRIPTION OF THE PREFERRED EMBODIMENTS

Figure 1:
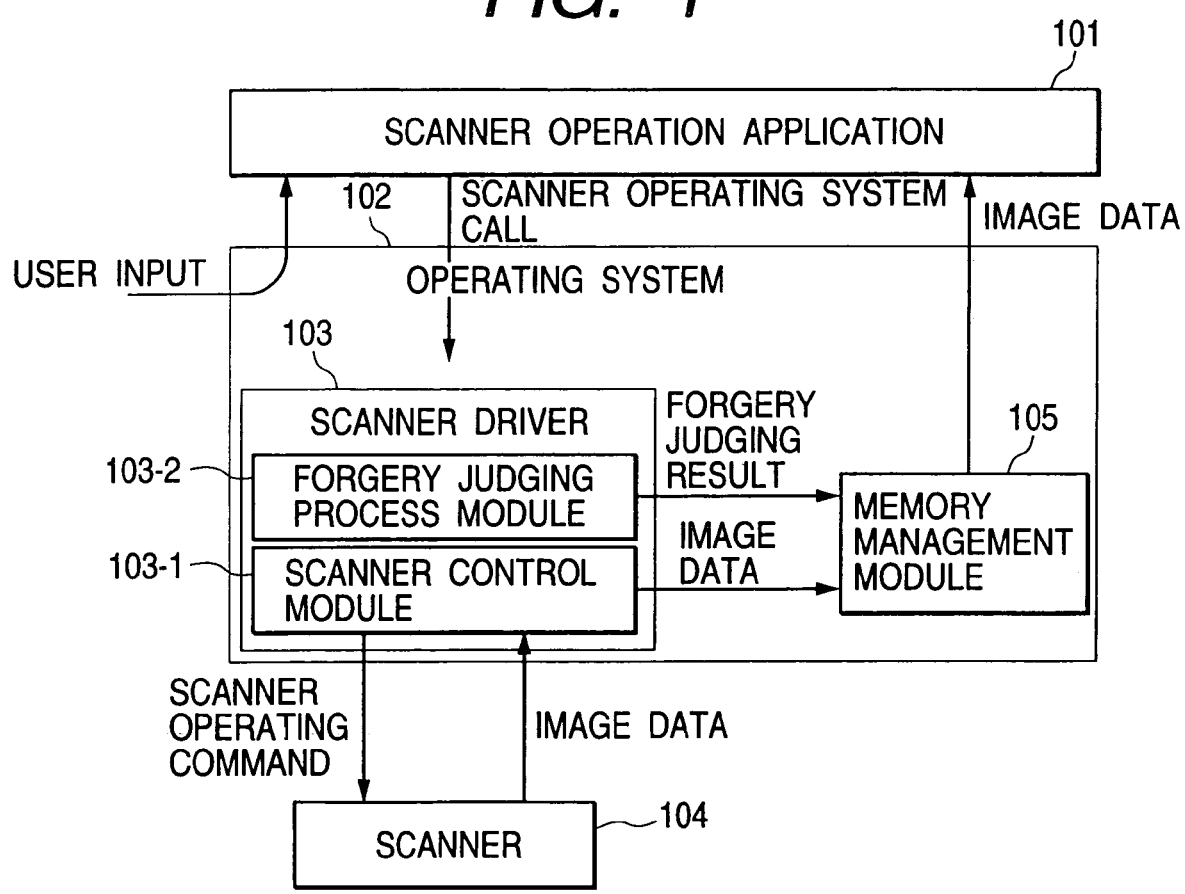
FIG. 1 is a view showing the configuration of an embodiment of the present invention.

FIG. 1 is a view showing the configuration of a scanner system including a host computer and constituting an embodiment of the present invention. On the host computer, there functions an operating system 102 (hereinafter written as OS), and a scanner operating application 101 functioning thereon provides an operating environment for example for an image reading operation of a scanner 104.

Figure 2:
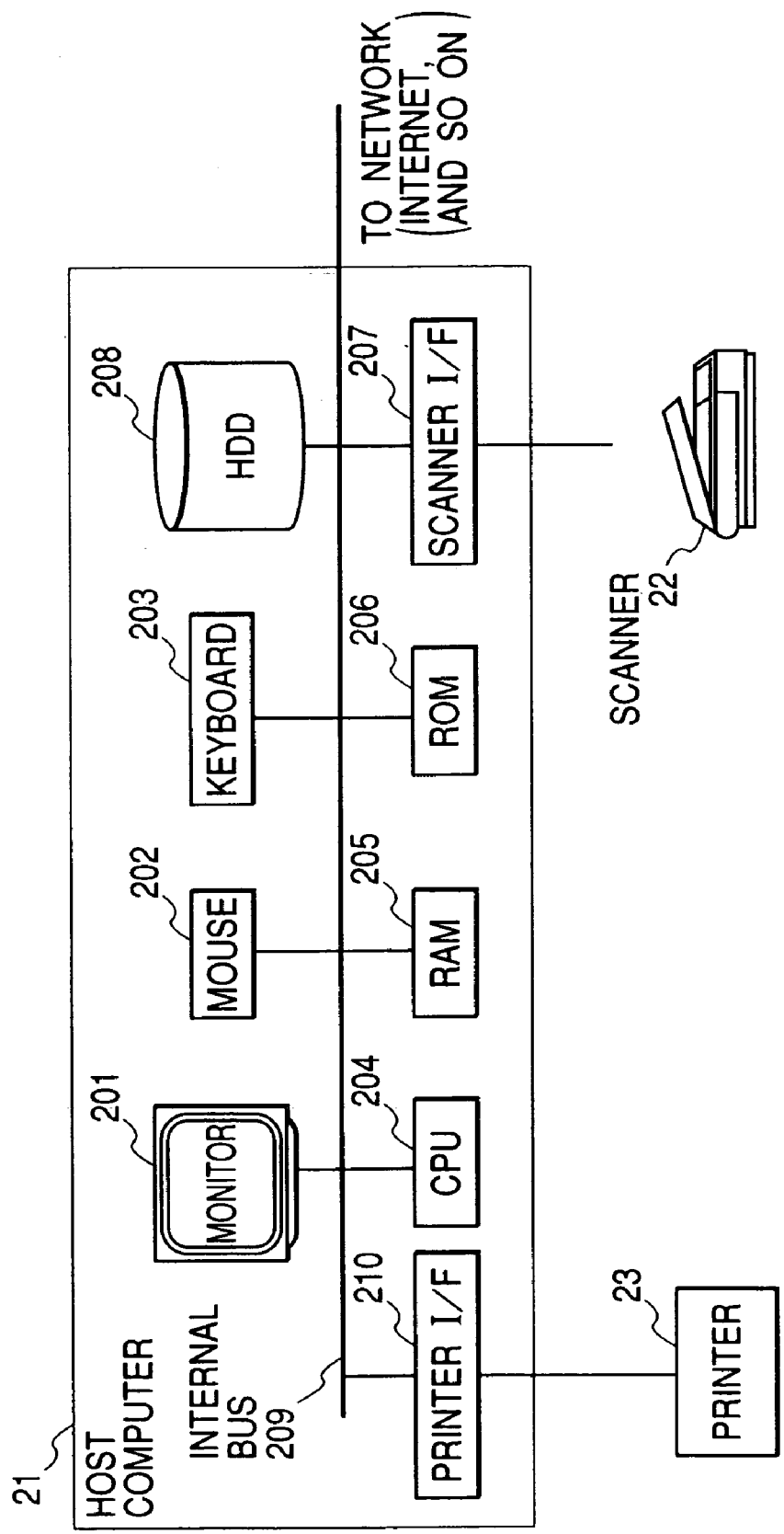
FIG. 2 is a view showing an example of the configuration of a first embodiment.

The scanner system shown in FIG. 1 is realized by a hardware configuration shown in FIG. 2, wherein the scanner system is composed of a host computer 21 and a scanner 22. The host computer 21 is provided with a monitor 201 for displaying GUI of the application 101 and the result of image reading from the scanner; a mouse 202 and a keyboard 203 for transmitting the input by the user to the application and the OS; an HDD 208 for storing various programs and image data; a ROM 206 for storing the basic program of the host computer; a RAM 205 for storing read programs and images; and a scanner I/F 207 for controlling the scanner 22, which are mutually connected by an internal bus 209 and controlled by a CPU 204.

On the host computer 21 of the above-described configuration, the OS and the application realize the following processes by the execution, by the CPU 204, of the program read from the HDD 208 to the RAM 205.

In the following there will be explained the internal structure of the OS within an extent necessary for explaining the present embodiment. In most OS, like UNIX, there are separately realized a device driver for interfacing with the hardware such as the scanner, and a module for managing other user applications and the memory. The present embodiment will be explained in the following by an OS having such separate structure.

The OS 102 is provided, as a module for controlling the scanner in addition to controlling the user input and other hardware devices, with a scanner driver 103, which, in the present embodiment, is provided with a scanner control module 103-1 for directly controlling the scanner 104 and a forgery judging module 103-2 for judging whether the image fetched from the scanner is forbidden for reproduction. The OS is further provided with a memory management module 105 for managing the image data area.

The scanner operating application 101 is composed for example of a GUI routine for interfacing with the user, a routine for interpreting the user input received through the OS 102 and issuing a command for operating the scanner, a routine for displaying the image read from the scanner; a routine for storing the read image on the HDD etc. Such GUI is displayed on the monitor 201, and various user inputs, for example starting the scanning operation, are entered by the mouse 202 and the keyboard 203.

The scanner 104 scans and electronically reads an original, placed on an original table, by a CCD line sensor according to a scanner operation signal from the scanner driver, and sends an image signal to the host computer according to a predetermined interface rule. The image signal is divided into plural color components, for example R, G and B, each being multi-value data of 8 to 12 bits.

Figure 3:
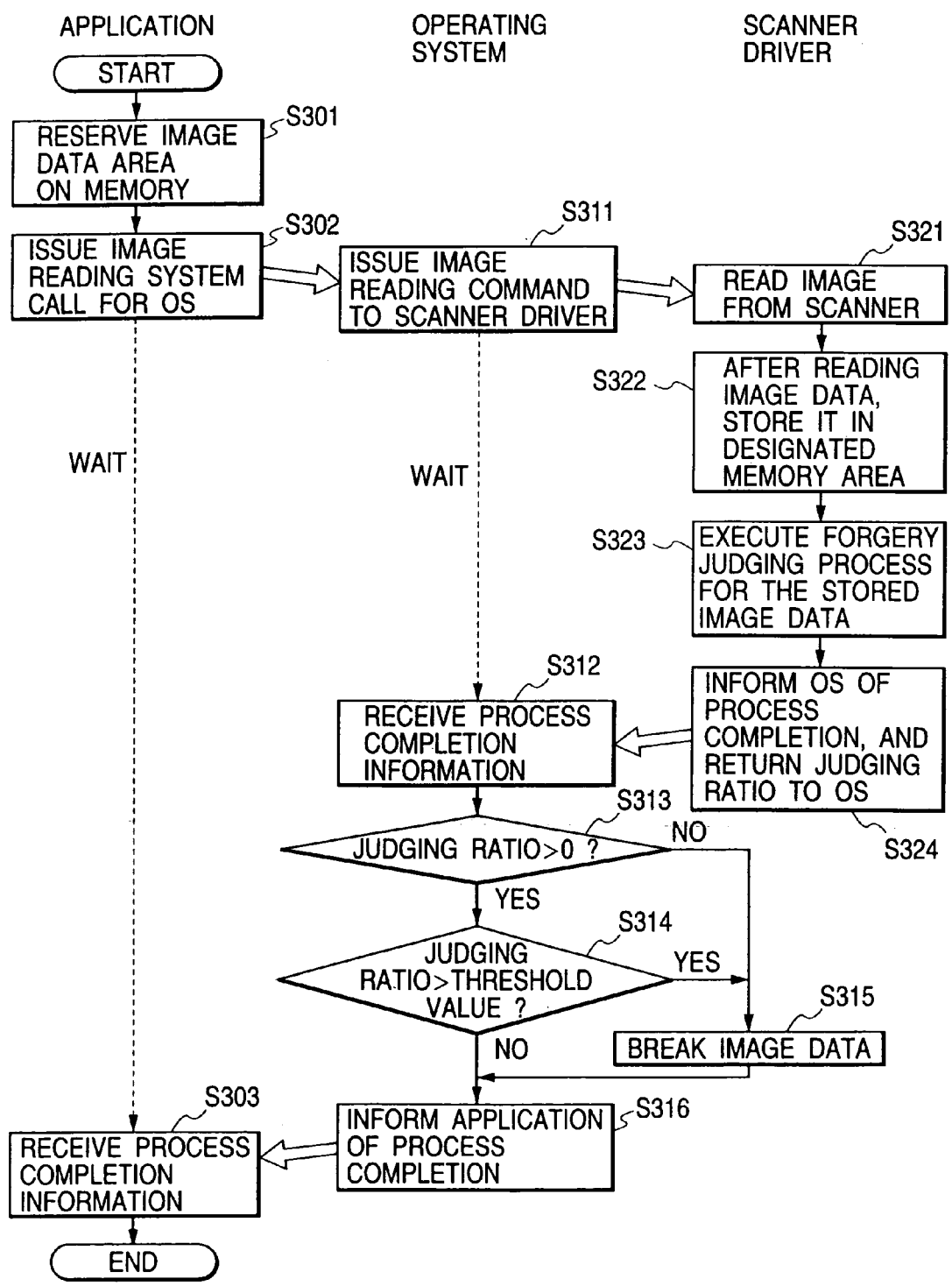
FIG. 3 is a flow chart showing the function of an embodiment of the present invention.

In the following there will be explained in detail the function of the present embodiment of the above-described configuration, with reference to the attached drawings. FIG. 3 shows an example of the operation sequence of the scanner system, on the modules of scanner operating application, OS and scanner driver.

When the user instructs a scan start operation through the scanner operating application by a manual operation with the mouse/keyboard on the GUI, the scanner initiates the image reading. When the application starts the reading operation, the application secures, on the RAM, an area for the designated image to be read in a step S301, then issues an image reading command specifying the scanner to the OS in a step S302, and then enters a waiting state until an image reading end notice is received in a step S303.

In response to the scan start command, the OS calls, in a step S311, a scanner control module corresponding to the specified scanner, then issues a command for image reading from the scanner, and enters a waiting state until the process of the scanner driver is terminated. In this operation, the forgery preventing module of the OS prepares, as a variable, a judgment rate representing whether the image data are of an original forbidden for reproduction, and assumes a negative initial value for the variable.

In response to the scan start command from the OS, the scanner control module in the scanner driver provides, in a step S321, the scanner with a scan start command specific to such scanner.

In a step S322, after image reading, the image signal received from the scanner is stored in the image data area secured by the application on the RAM, and the sequence is transferred to the forgery judgment module.

The forgery judgment module is provided, as a template, with a reproduction forbidden pattern on a memory (RAM or ROM) separate from the image memory. A step S323 executes pattern matching between the stored image data and the template, and outputs a judgment rate of a value between 0 and 100. An example of such pattern matching consists of calculating the mutual correlation between the image data and the template for each color component and outputting the maximum value of the correlations obtained for the different color components, but the method of such pattern matching is not particularly restricted.

Also the template for the reproduction forbidden pattern may be provided in plural units, and, in such case, the pattern matching is conducted between the image data and the plural patterns and the obtained maximum value can be outputted. In the foregoing, the forgery preventing module has been explained as a software module, but it may also be realized by a hardware for faster processing. Also in case of the process with the software module, the process time can be shortened for example by (1) preparing a spatially skipped (thinned) image signal from the stored image signal and executing judgment by the above-mentioned forgery judgment module on such skipped image signal, or (2) reducing the number of bits of the stored image signal for example from 8 bits to 5 bits and executing judgment by the above-mentioned forgery judgment module on the image signal with thus reduced number of bits.

After the image data reading and the forgery judging process, the scanner driver informs the OS of the end of process and returns the judgment rate thereto. The OS receives the notice for the end of process from the scanner driver in a step S312, and checks, in a step S313, the sign of the judgment rate returned from the scanner driver. A negative sign indicates that the judgment rate remains as the aforementioned initial value, so that the scanner driver does not execute the forgery judgment process or that the scanner driver is not equipped with the forgery judgment process. In such case, the image data may be of an original forbidden for reproduction, so that a step S315 destroys the image data for example by black-out of the image data area (conversion to black data). Otherwise, for a stricter measure, the image data area is for example opened by the memory management module to refuse the image data reception by the OS.

On the other hand, a positive sign indicates that the scanner driver has executed the forgery judgment process, so that the sequence proceeds to a step S314, which discriminates whether the image data are of an image forbidden for reproduction by an actual forgery judgment process. If the judgment rate is larger than a threshold value set in advance by the OS, the image data are regarded as an image forbidden for reproduction, and a step S315 destroys the image data.

It is also possible to set plural threshold values by the OS and to vary the measure to be taken according to the magnitude of the judgment rate. For example if the judgment rate, ranging from 0 to 100, is larger than a threshold value 95, the image data can be almost certainly an image forbidden for reproduction and the image data area is opened. This results in a strict measure that the application is forcedly closed. In such case it is necessary to inform the user of the reason for such forced closing of the application, there is given, on the monitor 201, a GUI display indicating that the application is closed by an illegal use and the application is thereafter closed. Also in case the judgment rate is larger than a threshold value 80 but smaller than 95, there can be conceived a measure of blacking out the image. Also in such case, there is given, on the monitor 201, a GUI display indicating the reason of image black-out. After the judgment of the step S314 or the process of the step S315 by the OS, a step S316 sends a notice for the end of process to the application, whereupon the image reading operation of the scanner system is terminated.

In the present embodiment, as explained in the foregoing, in acquiring the image signal by the scanner, there is judged the similarity between the obtained image signal and a specified image (image corresponding to a banknote or a valuable security document), and, in case of a high similarity (high judgment rate), the image signal is destroyed or the application is closed according to the result of such judgment, whereby prevented is the acquisition of a specified image for which the image formation is prohibited.

Also by executing the above-described judgment at the image signal scanning at the most upstream part in the sequence from the scanner through the host computer to the printer, there can be securely prevented the acquisition of the image signal, for which the image formation is prohibited, in a system consisting of a scanner, a host computer for image editing and a printer for image formation.

Also in case there is connected a printer not equipped with the function of judging a specified image, there can be securely prevented the printing of the image signal, corresponding to the image for which the image formation is prohibited, by providing the scanner driver or the OS with such function of judging the specified image.

The foregoing embodiments executes judgment on the image signal obtained from the scanner driver and the OS.

However, in the configuration executing the judgment of the specified image by the scanner driver and the OS, the judgment becomes impossible in case of employing a scanner driver not supporting the judgment of the specified image in the foregoing embodiment.

It is therefore possible also to provide the OS alone with the aforementioned judging function for the specified image, thereby executing the judgment of the image signal obtained in the scanner by the OS itself.

As an alternative method for avoiding the above-mentioned drawback that the judgment becomes impossible in case of a scanner not supporting the judgment of the specified image in the foregoing embodiment, it is also possible to provide the printer driver with the aforementioned judging function for the specified image, achieved by the scanner driver in the foregoing embodiment, thereby executing the judgment of the specified image by the OS and the printer driver.

More specifically, in this case, in response to the print command entered from the mouse 202 or the keyboard 203, the printer driver execute template matching on the image signal to be printed, stored in the memory management module of the OS, thereby judging whether the image consisting of the image signal is a specified image, and informs the OS of a judgment rate corresponding to the result of judgment.

According to the result of judgment, the OS either destroys the image data or forcedly closes the application as in the foregoing embodiment.

Also the template may be provided in plural units for judging plural valuable security documents.

Also as an alternative method for avoiding the abovementioned drawback that the judgment becomes impossible in case of a scanner not supporting the judgment of the specified image in the foregoing embodiment, it is also possible to refer to the version information of the scanner driver by the OS, and, if the scanner driver is identified as not supporting the judgment of the specified image, to display an operation image on the monitor 201 for requesting the user to download a scanner driver supporting the judgment of the specified image through a network (for example Internet). Also in the aforementioned case where the judgment rate is negative, it is possible to display an operation image on the monitor 201 for requesting the user to download a scanner driver having the forgery judgment module.

The scanner driver supporting the judgment of the specified image can be downloaded by a manual instruction of the user in response to such operation image.

Also in the foregoing embodiment, there is adopted the template matching on the image signal after spatial pixel skipping or after reduction of the number of pixels, in order to reduce the judgment process time.

As an alternative method of increasing the speed of judgment process, there can be adopted a configuration of preparing a template for a part of the specified image (for example a watermark portion, a number portion or a stamp portion in case of a Japanese banknote) and transmitting the high judgment rate to the OS at a timing when such part of the specified image is judged, whereby the judgment can be completed without judging the entire image signal corresponding to the specified image but executing the judgment only on the above-mentioned part.

Thus the time required for judgment can be shortened despite of the judgment process executed by a software process.

Also an even faster judgment process is possible by employing the image signal subjected to spatial pixel skipping or reduction in the number of pixels as in the foregoing embodiment and adopting the above-mentioned configuration of utilizing the template corresponding to a part of the specified image and outputting the high judgment rate at the completion of judgment of the above-mentioned part, instead of executing judgment on the entire image signal corresponding to the specified image.

Furthermore, as the probability of finding the specified image among the scanned images is generally low in most cases, it is possible to execute the approximate judgment with such high-speed method, and, if the judgment rate is high in such approximate judgment, to read the image signal without skipping from RAM in an image portion corresponding to the template in the above-mentioned approximate judgment and to execute the fine judgment with a separate template without data skipping prepared for the fine judgment, thereby achieving high-speed judgment and obtaining secure result for the image which is doubted as a specified image.

Also, the accuracy of judgment of the specified image may be deteriorated if a part thereof is employed as the template for judging such specified image.

It is therefore possible to prepare a template corresponding to a portion of the specified image and another template corresponding to another portion of the specified image, and, if the judgment rate is high in the judgment employing the former template corresponding to a portion of the specified image, to execute the judgment with the another template (time-shared judgment) and to destroy the image data only if the judgment rates exceed the threshold values in both templates, thereby reducing the probability of erroneous judgment and realizing highly accurate judgment.

The foregoing embodiments have been explained by flow charts indicating the process sequence, but the present invention naturally includes also a computer readable memory medium capable of generating in succession codes corresponding to such process sequence.

Also the foregoing embodiments have been explained by a configuration of obtaining the image signal from the scanner.

However the present invention is naturally effective also in case of acquiring image signal from various input or reproduction devices such as digital camera, digital camcorder, compact disk, mini disk, DVD, film scanner etc., for executing judgment by the driver and OS of such input or reproduction device as to whether such image signal belongs to a valuable security document.

As explained in the foregoing, the above-described configuration is adapted to output a scan command to the scanner, to judge whether the image, corresponding to the image signal obtained from the scanner in response to the scan command, represents a specified image, and to output the result of judgment for use in the processing of the image signal. Therefore, for example in a sequence consisting of a scanner, then a host computer and a printer, the above-mentioned judgment is executed in the most upstream timing of acquiring the image signal, thereby securely preventing the acquisition of the image signal corresponding to the specified image in a system consisting of a scanner for image data acquisition, a host computer (editing apparatus) for editing process and a printer for image formation. Also there can be achieved high-speed and accurate judgment.

Also the function of judging the specified image can be provided even if the scanner does not support the judgment of the specified image.

Also the function of judging the specified image can be provided corresponding to various input devices.

Also there is provided an operating system capable of acquiring the result of judgment indicting whether the image signal obtained by scanning represents the specified image and executing a process according to thus acquired result of judgment, whereby the process in the operating system can be securely based on the result of judgment of the specified image.

Second Embodiment

Figure 4:
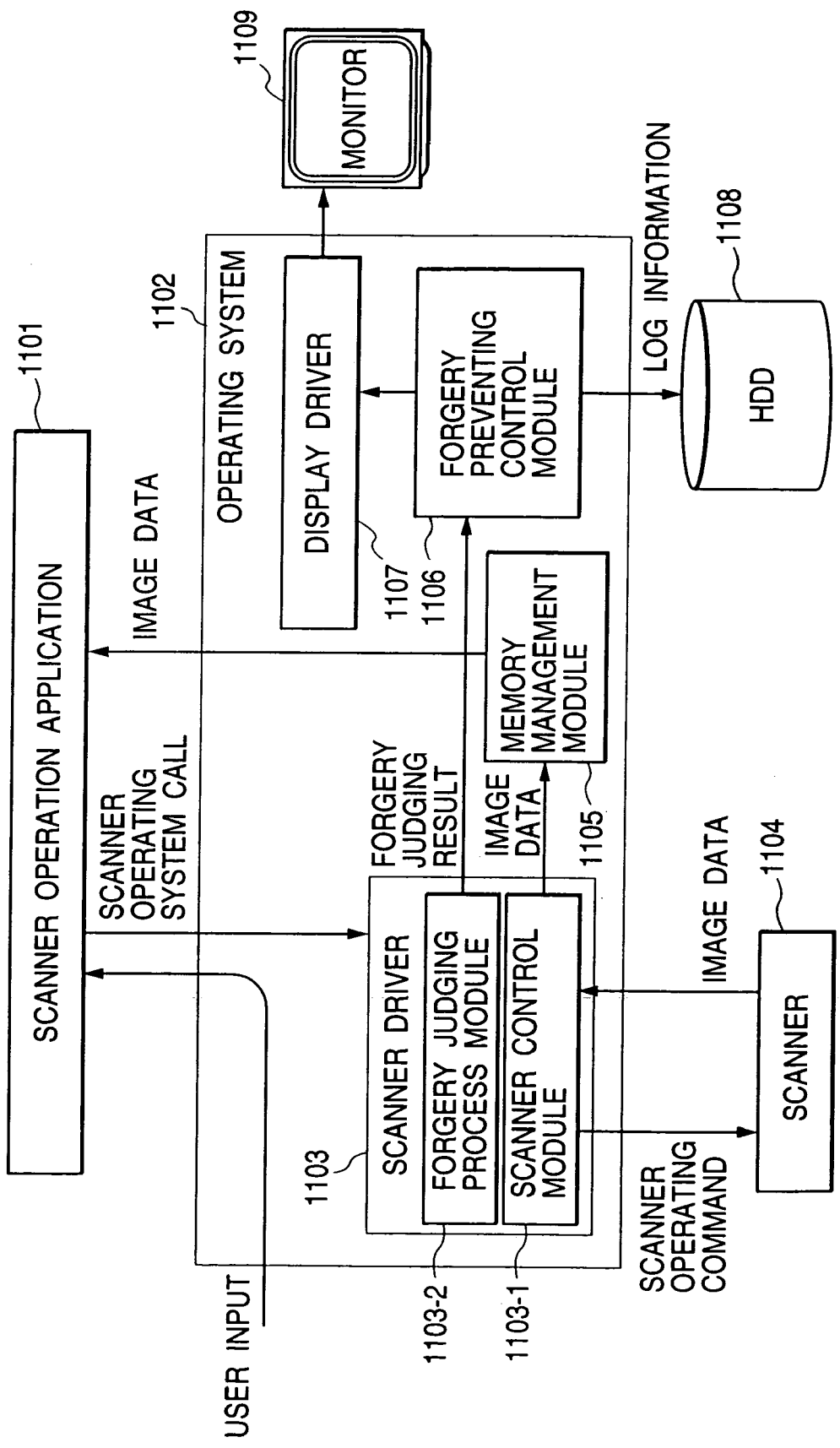
FIG. 4 is a view showing the configuration of a scanner system including a host computer.

FIG. 4 is a view showing the configuration of a scanner system including a host computer and constituting a second embodiment of the present invention. On the host computer, there functions an operating system 1102 (hereinafter written as OS), and a scanner operating application 1101 functioning thereon provides an operating environment for example for an image reading operation of a scanner 1104.

Figure 5:
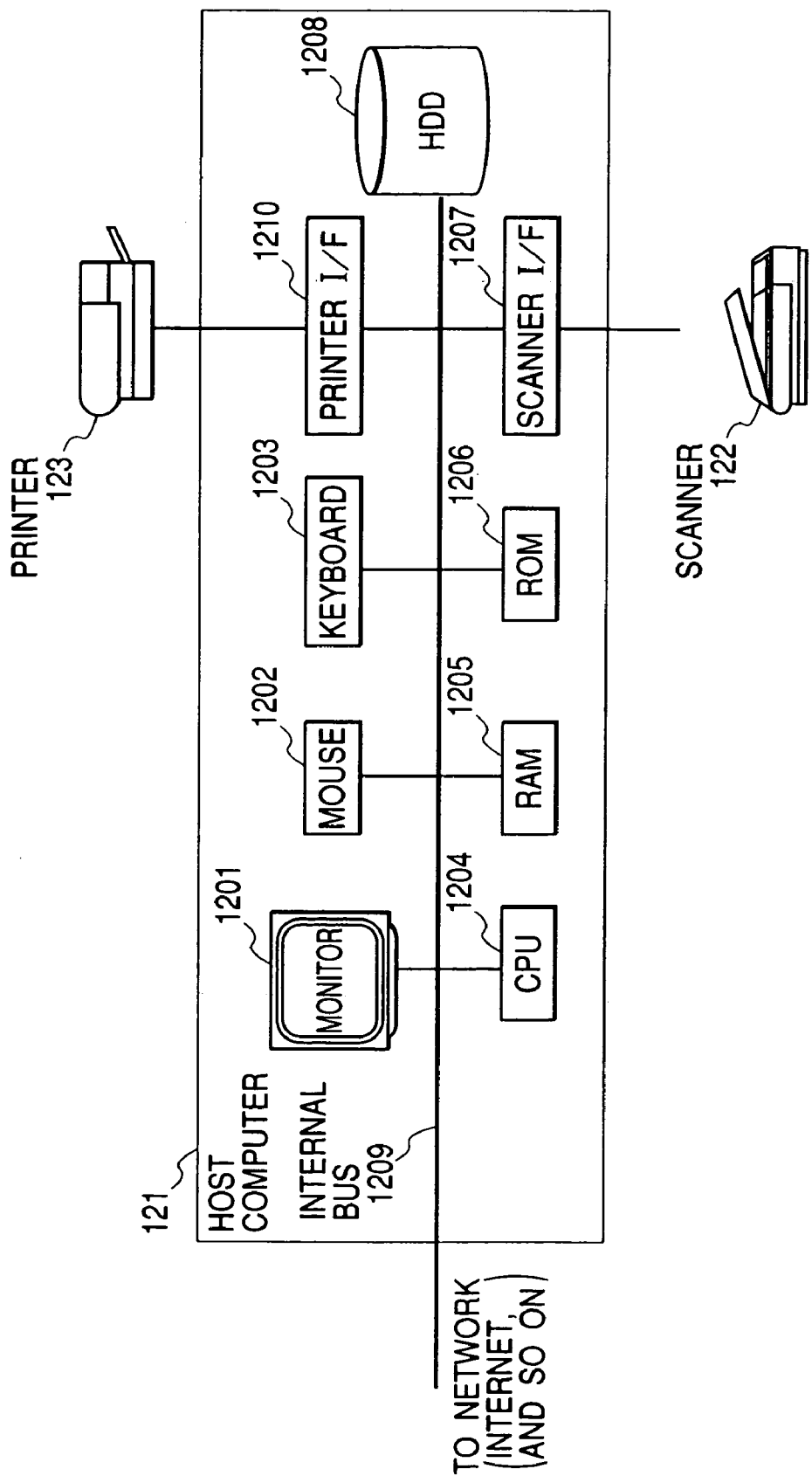
FIG. 5 is a view showing an example of the configuration of second and third embodiments.

The scanner system shown in FIG. 4 is realized by a hardware configuration shown in FIG. 5.

Referring to FIG. 5 the scanner system is composed of a host computer 121 and a scanner 122. The host computer 121 is provided with a monitor 1201 for displaying GUI of the application 1101 and the result of image reading from the scanner; a mouse 1202 and a keyboard 1203 for transmitting the input by the user to the application 1101 and the OS 1102; an HDD 1208 for storing various programs and image data; a ROM 1206 for storing the basic program of the host computer; a RAM 1205 for storing read programs and images; and a scanner I/F 1207 for controlling the scanner 122, which are mutually connected by an internal bus 1209 and controlled by a CPU 1204. On the host computer 121 of the above-described configuration, the OS 1102 and the scanner operating application 1101 are realized by the execution, by the CPU 1204, of the program read from the HDD 1208 to the RAM 1205.

In the following there will be explained the internal structure of the OS 1102 within an extent necessary for explaining the second embodiment. In most OS, like UNIX, there are separately realized a device driver for interfacing with the hardware such as the scanner, and a module for managing other user applications and the memory. The present embodiment will be explained in the following by an OS having such separate structure.

The OS 1102 is provided, as a module for controlling the scanner in addition to controlling the user input and other hardware devices, with a scanner driver 1103, which, in the present embodiment, is provided with a scanner control module 1103-1 for directly controlling the scanner 1104 and a forgery judging module 1103-2 for judging whether the image fetched from the scanner is prohibited for reproduction. The OS is further provided with a memory management module 1105 for managing the image data area.

The scanner operating application 1101 is composed for example of a GUI routine for interfacing with the user, a routine for interpreting the user input received through the OS 1102 and issuing a command for operating the scanner, a routine for displaying the image read from the scanner, a routine for storing the read image on the HDD etc.

The scanner 1104 scans and electronically reads an original, placed on an original table, by a CCD line sensor according to a scanner operation signal from the scanner driver 1103, and sends an image signal to the host computer according to a predetermined interface rule. The image signal is divided into plural color components, for example R, G and B, each being multi-value data of 8 to 12 bits.

Figure 6:
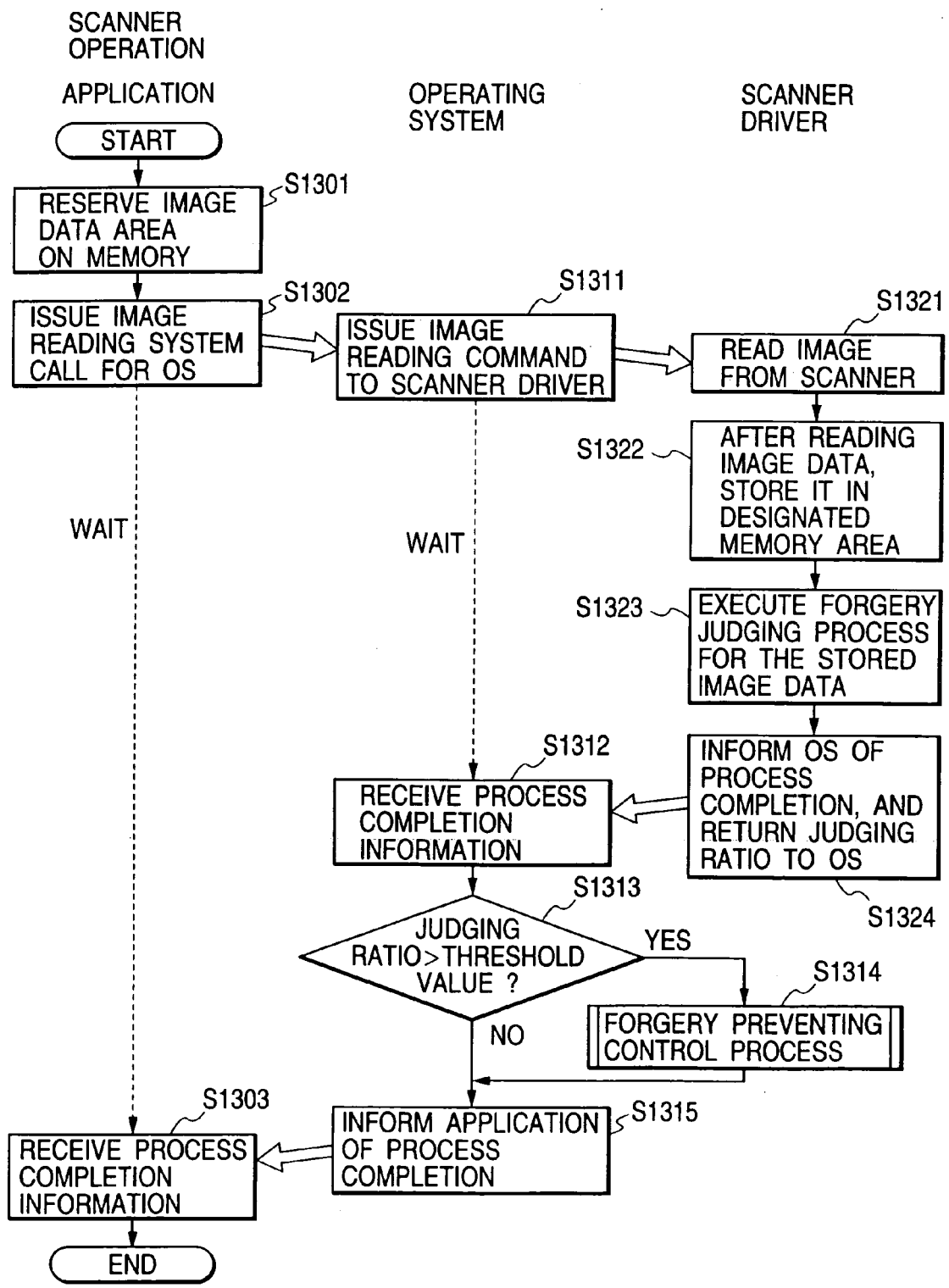
FIG. 6 is a flow chart showing the function of a second embodiment.

In the following there will be explained in detail the function of the present embodiment of the above-described configuration, with reference to the attached drawings. FIG. 6 shows an example of the operation sequence of the scanner system, on the modules of scanner operating application 1101, OS 1102 and scanner driver 1103.

When the user instructs a scan start operation through the scanner operating application 1101 by a manual operation with the mouse 1202 or the keyboard 1203 on the GUI (graphical user interface), the scanner initiates the image reading. When the scanner operating application starts the reading operation, the application secures, on the RAM, an area for the designated image to be read in a step S1301, then issues an image reading command specifying the scanner to the OS in a step S1302, and then enters a waiting state until an image reading end notice is received in a step S1303.

In response to the scan start command, the OS 1102 calls, in a step S1311, a scanner driver module corresponding to the specified scanner, then issues a command for image reading from the scanner, and enters a waiting state until the process of the scanner driver 1103 is terminated. In this operation, the forgery preventing module of the OS prepares, as a variable, a judgment rate representing whether the image data are of an original forbidden for reproduction.

In response to the scan start command from the OS 1102, the scanner control module 1103-1 in the scanner driver provides, in a step S1321, the scanner with a scan start command specific to such scanner. In a step S1322, after image reading, the image signal received from the scanner is stored in the image data area secured by the application, and the sequence is transferred to the forgery judgment module 1103-2.

The forgery judgment module 1103-2 is provided, as a template, with a reproduction forbidden pattern on a memory (RAM or ROM) separate from the image memory. A step S1323 executes pattern matching between the stored image data and the template, and outputs a judgment rate of a value between 0 and 100. An example of such pattern matching consists of calculating the mutual correlation between the image data and the template for each color component and outputting the maximum value of the correlations obtained for the different color components, but the method of such pattern matching is not particularly restricted. Also the template for the reproduction forbidden pattern may be provided in plural units, and, in such case, the pattern matching is conducted between the image data and the plural patterns and the obtained maximum value can be outputted. In the foregoing, the forgery preventing module has been explained as a software module, but it may also be realized by a hardware for faster processing. Also in case of the process with the software module, the process time can be shortened for example by (1) preparing a spatially skipped image data from the aforementioned image data and executing template matching in the above-mentioned forgery judgment module between such image data and the reproduction forbidden pattern (pattern prohibited for reproduction, corresponding to the image data after skipping), or (2) reducing the number of bits of the stored image data and executing template matching by the above-mentioned forgery judgment module with the reproduction forbidden pattern (pattern prohibited for reproduction, corresponding to the image data after bit number reduction).

After the image data reading and the forgery judging process, the scanner driver informs the OS of the end of process and returns the judgment rate thereto.

The OS receives the notice for the end of process from the scanner driver in a step S1312, and discriminates, in a step S1313, whether the image data are of an image forbidden for reproduction by an actual forgery judgment process. If the judgment rate is larger than a threshold value set in advance by the OS, the image data are regarded to have possibility as an image forbidden for reproduction, and the sequence proceeds to a step S1314 for forgery preventing control.

Figure 9:
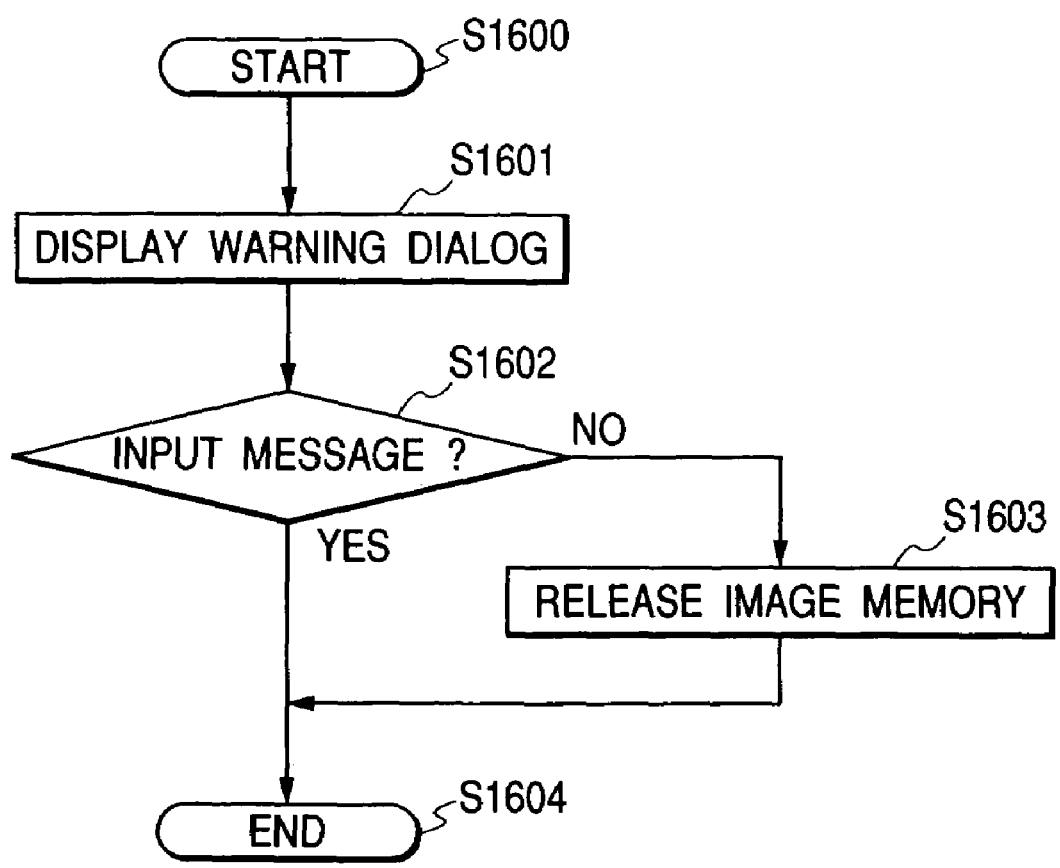
FIG. 9 is a flow chart showing the sequence of a forgery preventing process.

FIG. 9 is a view showing an example of the process flow of the forgery preventing process S1314. A step S1601 starts the process and a step S1601 displays a user input image as shown in FIG. 7 on a monitor 1109 through a display driver 1107. In this manner, in case the image entered from the scanner has the probability that it is prohibited for reproduction, the display asks the user whether he really wants to read the image. A step S1602 checks whether the user input is "yes" or "no", and, in case of "yes" (in case of image reading), an operation history as shown in FIG. 8 is stored in the HDD 1108. In case of "no" (if image reading is canceled), a step S1603 releases the memory storing the image, thereby prohibiting the image reading.

After the above-described process, a step S1315 sends a notice for the end of process to the application, whereby the image reading operation of the scanner system is terminated.

In the present embodiment, as explained in the foregoing, at the acquisition of the image signal by the scanner, there is judged the similarity between the image signal and the specified image (corresponding to a valuable security document such as banknote) and the result of judgment can be informed to the operator.

Consequently, in case the image prohibited for reproduction is read just for a mischievous fun of the operator, an alarm can be given to the operator.

However, in case the image reading is executed even after the above-mentioned warning is given, the prevention of the forging action is not sufficient by recording the history as explained above.

Therefore, in the present embodiment, the forgery preventing module 1106 has a configuration capable, in case of storing the image data, obtained by reading the reproduction prohibited image judged by the above-described judgment, in the HDD 1208 of the host computer 121, of adding information indicating that the image data represent an image which is prohibited for reproduction.

Also the printer driver or the printing device is given a function of judging such added information and executes a forgery preventing process such as blacking out the formed image, whereby the forging action can be prevented.

Also the added information can be securely added to the image data by adopting such an image data recording format that the added information is not removed even in case the image data are copied an external memory medium (such as a floppy disk, an optical disk, a mini disk, an MO etc.). Such secure addition to the image data can be achieved by adding the information as an digital watermark to the image data.

Therefore, for example in a sequence consisting of a scanner, then a host computer and a printer, the above-mentioned judgment is executed in the most upstream timing of scanning the image signal, thereby securely preventing the acquisition of the image signal corresponding to the image which is prohibited for reproduction, in a system consisting of a scanner for image data acquisition, a host computer (editing apparatus) for editing process and a printer for image formation. Also there can be achieved high-speed and accurate judgment.

Also the printing of the image signal, corresponding to the image prohibited for reproduction, can be securely prevented, even in case a printer not supporting the function of judging the specified image is connected, by providing the scanner driver or the OS with such function of judging the specified image.

Third Embodiment

Figure 10:
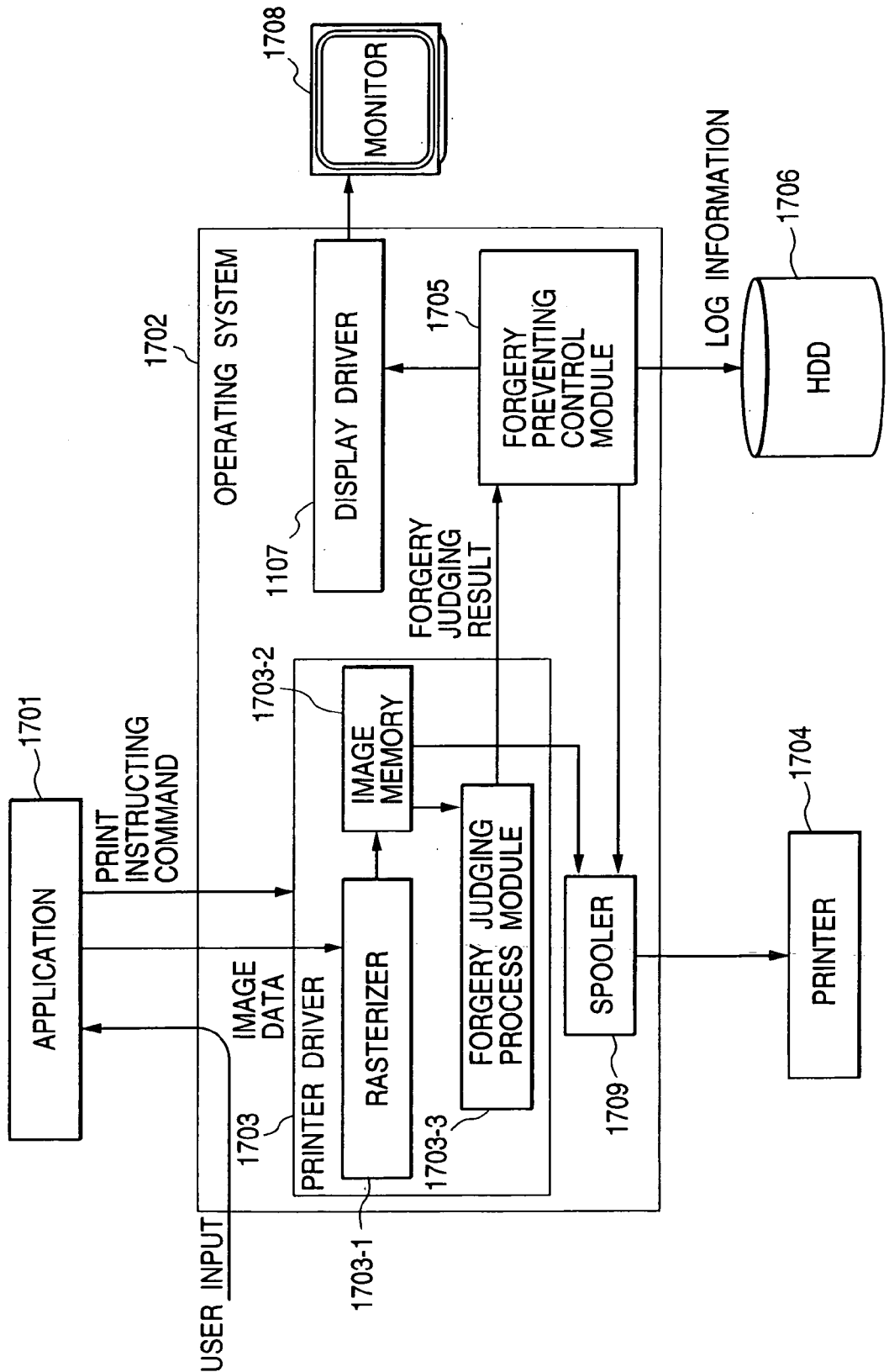
FIG. 10 is a view showing the configuration of a printer system.

FIG. 10 shows the configuration of a third embodiment of the present invention, which executes forgery prevention by a printer driver 1703 and an OS 1702 in an image processing system consisting of a host computer and a printer. As in the second embodiment, on the host computer, there functions an operating system 1702 (CS), and an application 1701 functioning thereon provides an operating environment such as an image output operation to a printer 1704.

Also as in the scanner system shown in FIG. 4, the printer system shown in FIG. 10 is realized by a hardware configuration shown in FIG. 5.

Referring to FIG. 10, the printer system is composed of a host computer 121 and a printer 123. The host computer 121 is provided with a monitor 1201 for displaying GUI of the application 1701 and the result of image reading from the scanner; a mouse 1202 and a keyboard 1203 for transmitting the input by the user to the application and the OS; an HDD 1208 for storing various programs and image data; a ROM 1206 for storing the basic program of the host computer; a RAM 1205 for storing read programs and images; and a printer I/F 1210 for controlling the printer 123, which are mutually connected by an internal bus 1209 and controlled by a CPU 1204.

On the host computer 121 of the above-described configuration, the OS and the application are realized by the execution, by the CPU 1204, of the program read from the HDD 1208 to the RAM 1205. The OS 1702 is provided, as a module for controlling the printer in addition to controlling the user input and other hardware devices, with a printer driver 1703, which, in the present embodiment, is provided with a rasterizer 1703-1 for generating image data suitable for the printer 1704, an image memory 1703-2 for storing the generated image data, and a forgery judging module 1703-3 for judging whether the rasterized image is prohibited for reproduction. The result of forgery judgment, outputted from the forgery judging module, is transferred to a forgery prevention control module 1705, which in response executes a process for preventing or suppressing the forging action.

The OS 1702 is also provided with a print spooler 1709 for executing control for outputting the rasterized image to the printer. In the foregoing, the rasterizer, image memory and forgery judging module are supposed to be executed by the printer driver, namely realized by a software process, but these may be also executed in the printer 1704. In such case, the result of forgery judgment executed in the printer may be returned to the forgery prevention control module 1705.

In the following there will be explained the flow of the forgery preventing process in the present embodiment.

In response to a print start command entered by a manual operation with the mouse 1202 or the keyboard 1203 on the GUI (graphical user interface) displayed on the monitor 1708, the OS 1702 instructs the printer driver 1703 to print the data received from the application 1701. In response to the print instruction, the printer driver 1703 causes the rasterizer 1703-2 to develop the document to be printed as image data and stores the image data in the image memory 1703-2. The stored image is transferred to the forgery judging module 1703-2 and the print spooler 1709, which respectively start the forgery judging process and the printing process. The forgery judging module judges, as in the second embodiment, whether the image to be printed includes a pattern prohibited for reproduction, and sends the judgment rate to the forgery prevention control module 1705, which compares the threshold value set in advance by the OS with the judgment rate, and, if the latter is larger, display an alarming dialog as shown in FIG. 7 on the monitor 1708. If the user decides not to execute printing in response to the displayed dialog, a spooling interruption command is supplied to the printer spooler 1704 to terminate the printing process. In case the user decides to execute printing in response to the displayed dialog, an operation history information as shown in FIG. 8 is stored in 1706 whereupon the printing process is terminated.

For a high judgment rate, the forgery preventing module may display interruption of printing on the monitor 1708 and issue a spooling interruption command to the printer spooler 1704, instead of alarm display.

In the present embodiment there has been explained a configuration in which the host computer and the printer are connected in a one-to-one relationship, but the forgery judgment may also be executed by the OS including the printer driver, in a configuration where plural host computers are connected to a printer through a network.

The forgery judging configuration adopted in the printer allows to judge the forgery in the same manner as in the OS.

However, the network printer is occupied during the judgment of the image data representing the image prohibited for reproduction, and such situation is undesirable for the operators of other host computers.

On the other hand, the forgery judgment executed in the OS is effective in preventing unnecessary occupation of the printer.

Also the forgery judgment in the OS realizes secure prohibition of reproduction even in case of employing a printer not supporting the function of judging the image prohibited for reproduction.

In the foregoing second and third embodiments there has not been explained the number of templates, but it is also possible, in these embodiments, to prepare plural templates corresponding to the valuable security documents of plural kinds, thereby judging such documents of plural kinds.

Also as an alternative method for avoiding the above-mentioned drawback that the judgment becomes impossible in case of a scanner (or printer) driver not supporting the judgment of the specified image in the foregoing embodiments, it is also possible to refer to the version information of the scanner (or printer) driver by the OS, and, if the scanner (or printer) driver is identified as not supporting the judgment of the specified image, to display an operation image on the monitor 1201 for requesting the user to download a scanner (or printer) driver supporting the judgment of the specified image through a network (for example Internet).

The scanner (or printer) driver supporting the judgment of the specified image can be downloaded by a manual instruction of the user in response to such operation image.

Also in the foregoing embodiment, there is adopted the template matching on the image signal after spatial pixel skipping or after reduction of the number of pixels, in order to reduce the judgment process time.

As an alternative method of increasing the speed of judgment process, there can be adopted a configuration of preparing a template for a part of the specified image (for example a watermark portion, a number portion or a stamp portion in case of a Japanese banknote) and transmitting the high judgment rate to the OS at a timing when such part of the specified image is judged, whereby the judgment can be completed without judging the entire image signal corresponding to the specified image but executing the judgment only on the above-mentioned part.

Thus the time required for judgment can be shortened despite of the judgment process executed by a software process.

Also an even faster judgment process is possible by employing the image signal subjected to spatial pixel skipping or reduction in the number of pixels as in the foregoing embodiment and adopting the above-mentioned configuration of utilizing the template corresponding to a part of the specified image and outputting the high judgment rate at the completion of judgment of the above-mentioned part, instead of executing judgment on the entire image signal corresponding to the specified image.

Furthermore, as the probability of finding the specified image among the scanned images is generally low in most cases, it is possible to execute the approximate judgment with such high-speed method, and, if the judgment rate is high in such approximate judgment, to read the image signal without skipping from RAM in an image portion corresponding to the template in the above-mentioned approximate judgment and to execute the fine judgment with a separate template without data skipping prepared for the fine judgment, thereby achieving high-speed judgment and obtaining secure result for the image which is doubted as a specified image.

Also, the accuracy of judgment of the specified image may be deteriorated if a part thereof is employed as the template for judging such specified image.

It is therefore possible to prepare a template corresponding to a portion of the specified image and another template corresponding to another portion of the specified image, and, if the judgment rate is high in the judgment employing the former template corresponding to a portion of the specified image, to execute the judgment with the another template (time-shared judgment) and to destroy the image data only if the judgment rates exceed the threshold values in both templates, thereby reducing the probability of erroneous judgment and realizing highly accurate judgment.

The foregoing embodiments have been explained by flow charts indicating the process sequence, but the present invention naturally includes also a computer readable memory medium capable of generating in succession codes corresponding to such process sequence.

Also the foregoing embodiments have been explained by a configuration of obtaining the image signal from the scanner.

However the present invention is naturally effective also in case of acquiring image signal from various input or reproduction devices such as digital camera, digital camcorder, compact disk, mini disk, DVD, film scanner etc., for executing judgment by the driver and OS of such input or reproduction device as to whether such image signal belongs to a valuable security document.

As explained in the foregoing, there can be provided the function of judging the specified image, even if the printer does not support the judgment of the specified image.

Also there can be provided the function of judging the specified image, corresponding to various input devices.

Also there is provided an operating system capable of acquiring the result of judgment indicating whether the image corresponding to the image signal obtained by a print instruction represents the specified image and outputting a signal for executing a process according to thus acquired result of judgment, whereby the process in the operating system can be securely based on the result of judgment of the specified image.

Also the foregoing embodiment is adapted to send an image signal generation command to an input device, to judge whether the image corresponding to the image signal obtained from the input device in response to the above-mentioned command represents a specified image, and to output a signal for displaying the result of the judgment on the display unit, whereby the operator can be informed of the result of the judgment whether the image corresponding to the image signal represents a specified image.

Also the foregoing embodiment is adapted to judge whether the image corresponding to the image signal represents a specified image, and, if the judgment identifies that the above-mentioned image is a specified image, to add information indicating that the above-mentioned image is a specified image, in storing thus judged image data, so that the information can be added at the storage of thus judged image. Such information can be added also at the storage of the judged image in a memory medium.

What is claimed is:

1. An image processing method for use in a printer driver for use with a device having an operating system, a forgery preventing module, and a display driver said method comprising the steps of: the printer driver receiving an instruction for a printing process, judging whether an image corresponding to an image signal developed represents a specified image according to the printing process, and outputting a result obtained in said judging step so as to use the result in a processing of said image signal; wherein the forgery preventing module in the operating system outputs an instruction for executing a predetermined display to the display driver according to the result obtained in said judging step and output in said outputting step.

2. An image processing method for use in a printer driver according to claim 1,
wherein the forgery preventing module in the operating system outputs an instruction for terminating a spooling operation according to the result obtained in said judging step.

3. An image processing method for use in a printer driver according to claim 1,
wherein said judging step executes judgement using template matching.

4. An image processing method for use in a printer driver according to claim 1,
wherein said predetermined display indicates that the image is an image of which reproduction is inhibited.

5. An image processing method for use in a printer driver according to claim 4,
wherein when an instruction for printing is issued after the display, log information is stored in memory means.

6. An image processing method for use in a printer driver according to claim 1,
wherein said judging step executes judgement for an image corresponding to the image signal and plural specific images.

7. An image processing method for use in a printer driver according to claim 1,
wherein said judging step executes judgement with an image signal obtained by spatial thinning of the image signal.

8. An image processing method for use in a printer driver according to claim 1,
wherein said judging step executes with an image signal obtained by reducing the number of bits of the image signal.

9. An image processing method for use in a printer driver according to claim 1,
wherein said judging step terminates when there is obtained a high judgment rate indicating that the image corresponding to the obtained image signal is a specific image.

10. An image processing method for use in a printer driver according to claim 1,
wherein, said judging step executes judgement with the image signal obtained by spatial thinning of the image signal and, when a result of the judgement indicates a high probability of a specific image, said judging step executes judgement with the image signal without thinning.

11. An image processing method for use in a printer driver according to claim 10,
wherein said judgment with the unthinned image signal is executed with only the image signal of an area containing an object of judgment in the thinned image signal.

12. An image processing method for use in a printer driver according to claim 10,
wherein said judging step executes the second judgement using the unthinned image signal when a high judgment rate is obtained in the first judgment using the thinned image signal for two kinds of judgements provided for a same specific image.

13. A printer adapted for printing an image from the printer driver according to claim 1.

14. An image processing method for use in a printer driver for use with a device having an operating system and a forgery preventing module, said method comprising the steps of: the printer driver receiving an instruction for a printing process, judging whether an image corresponding to an image signal developed represents a specified image according to the printing process, and outputting a result obtained in said judging step so as to use the result in processing of said image signal; wherein the forgery preventing module in the operating system outputs an instruction for terminating a spooling operation according to the result obtained in said judging step and output in said outputting step.

15. An image processing method for use in a printer driver according to claim 14,
wherein said judging step executes judgement using template matching.

16. An image processing method for use in a printer driver according to claim 14,
wherein said judging step executes judgement for an image corresponding to the image signal and plural specific images.

17. An image processing method for use in a printer driver according to claim 14,
wherein said judging step executes judgement with an image signal obtained by spatial thinning of the image signal.

18. An image processing method for use in a printer driver according to claim 14,
wherein said judging step executes with an image signal obtained by reducing the number of bits of the image signal.

19. An image processing method for use in a printer driver according to claim 14,
wherein said judging step terminates when there is obtained a high judgment rate indicating that the image corresponding to the obtained image signal is a specific image.

20. An image processing method for use in a printer driver according to claim 14, wherein, said judging step executes judgement with the image signal obtained by spatial thinning of the image signal and, when a result of the judgement indicates a high probability of a specific image, said judging step executes judgement with the image signal without thinning.

21. An image processing method for use in a printer driver according to claim 20, wherein said judgment with the unthinned image signal is executed with only the image signal of an area containing an object of judgment in the thinned image signal.

22. An image processing method for use in a printer driver according to claim 20, wherein said judging step executes the second judgement using the unthinned image signal when a high judgment rate is obtained in the first judgment using the thinned image signal for two kinds of judgements provided for a same specific image.

* * * * *

UNITED STATES PATENT AND TRADEMARK OFFICE
CERTIFICATE OF CORRECTION

PATENT NO. : 7,262,870 B1
APPLICATION NO. : 09/541615
DATED : August 28, 2007
INVENTOR(S) : Takeshi Namikata It is certified that error appears in the above-identified patent and that said Letters Patent is hereby corrected as shown below:

On The Title Page
Item (56) References Cited, Other Publications
"Microsoft Press Computer Dictionary, $3^{rd}$ edition" should be deleted.

On The Title Page
Item (57) Abstract, line 6
"result" should read --result in--.

Col. 4, line 63, "executes" should read --execute--.

Col. 5, line 18, "execute" should read --executes--.

line 62, "of" should be deleted.

Col. 6, line 57, "indicting" should be --indicating--.

Col. 9, line 47, "an" should read --to an--.

Col. 12, line 2, "of" should be deleted.

Col. 13, line 21, "driver" should read --driver,--.

line 63, "executes" should read --executes judgement--.

Col. 14, line 7, "wherein," should read --wherein--.

UNITED STATES PATENT AND TRADEMARK OFFICE
CERTIFICATE OF CORRECTION

PATENT NO. : 7,262,870 B1
APPLICATION NO. : 09/541615
DATED : August 28, 2007
INVENTOR(S) : Takeshi Namikata It is certified that error appears in the above-identified patent and that said Letters Patent is hereby corrected as shown below:

Col. 15, line 1, "wherein," should read --wherein--.

Signed and Sealed this

Twenty-seventh Day of May, 2008

JON W. DUDAS
*Director of the United States Patent and Trademark Office*